March 22, 1955  J. R JULIAN  2,704,528
SOLDERING CLAMP DEVICE FOR CONNECTING EAVE TROUGHS
Filed Sept. 9, 1953  2 Sheets-Sheet 1
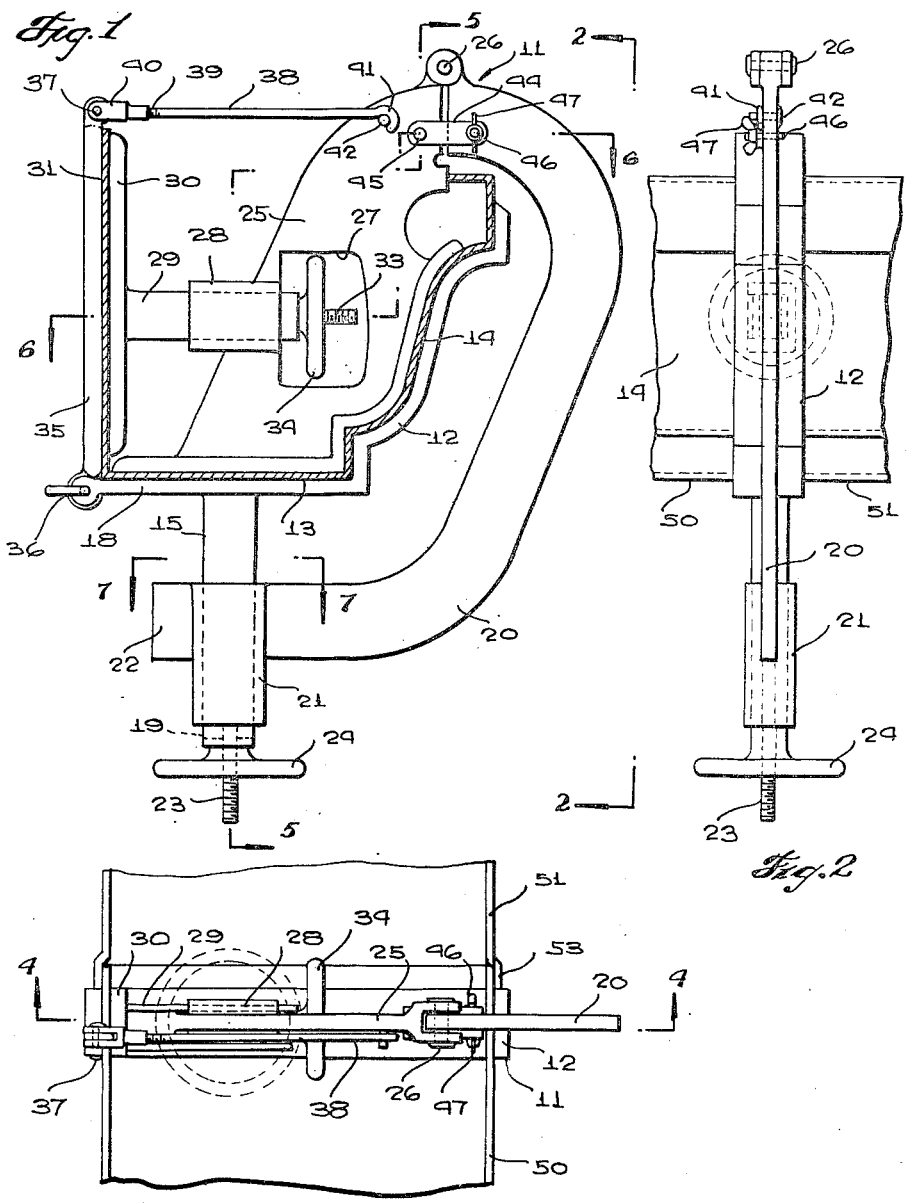
INVENTOR
JONATHAN R. JULIAN
BY
McMorrow, Berman + Davidson
ATTORNEYS

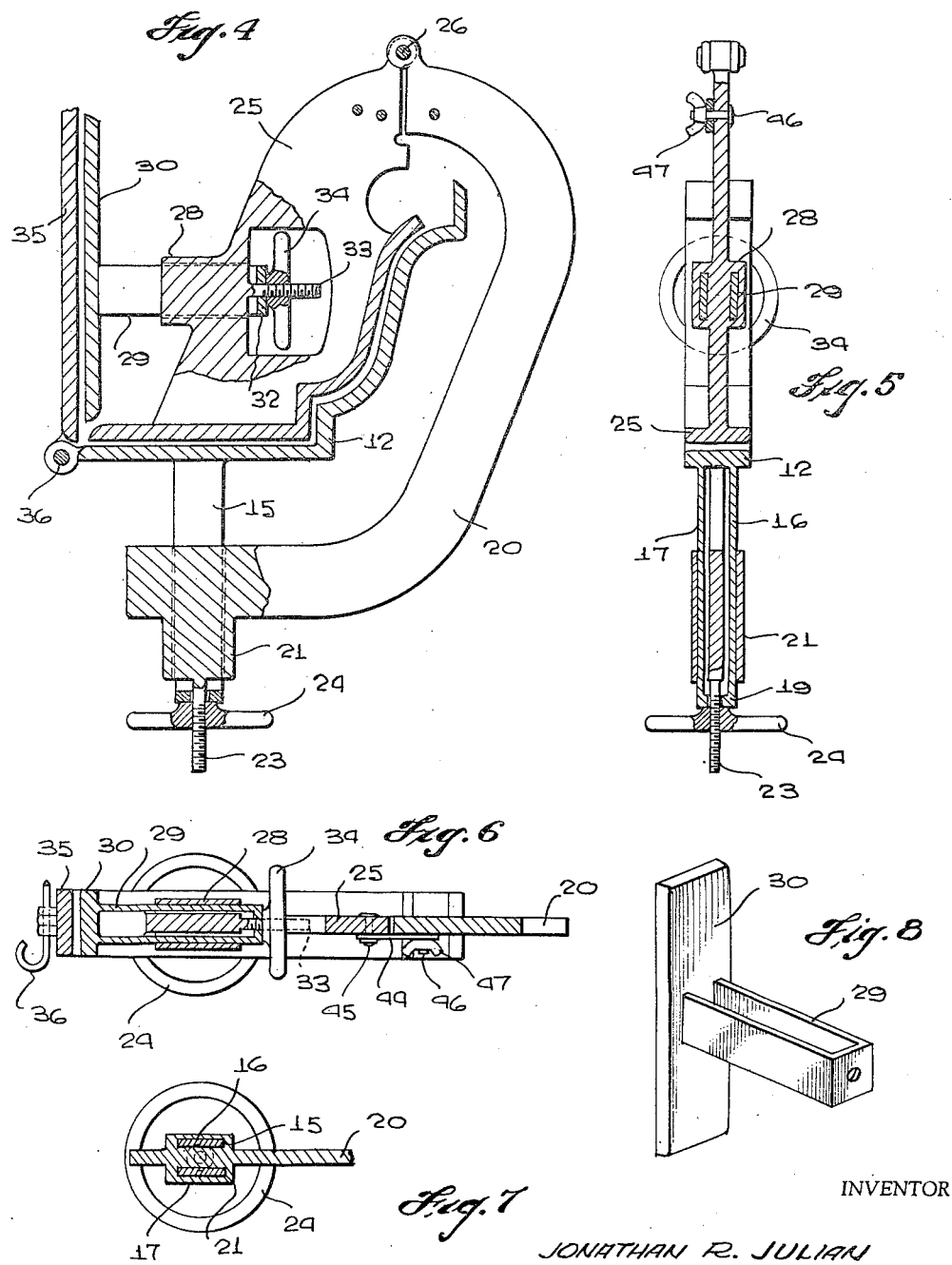

United States Patent Office 2,704,528
Patented Mar. 22, 1955

2,704,528

SOLDERING CLAMP DEVICE FOR CONNECTING EAVE TROUGHS

Jonathan R. Julian, Owensville, Ind.

Application September 9, 1953, Serial No. 379,214

4 Claims. (Cl. 113—101)

This invention relates to clamp devices, and more particularly to devices for clamping eave troughs when the troughs are to be soldered together.

The main object of the invention is to provide a novel and improved soldering clamp device for connecting eave troughs, said device being simple in construction, being easy to secure on the troughs or gutters to be soldered together, and providing a rigid connection between the members to be soldered, enabling the connection to be made in a rapid and efficient manner.

A further object of the invention is to provide an improved soldering clamp for connecting eaves troughs, the improved clamp device being inexpensive to fabricate, being sturdy in construction, being easy to mount on the troughs to be soldered together, and being readily detachable after the soldered connection has been made.

Further objects and advantages of the invention will become apparent from the following description and claims, and from the accompanying drawings, wherein:

Figure 1 is a vertical cross sectional view taken through an eaves trough and showing a soldering clamp device according to the present invention mounted thereon in operative position.

Figure 2 is a front elevational view taken on the line 2—2 of Figure 1.

Figure 3 is a top plan view of the structure shown in Figures 1 and 2.

Figure 4 is a vertical cross sectional view taken on the line 4—4 of Figure 3 and showing portions of the clamp device in vertical cross section.

Figure 5 is a vertical cross sectional view taken on the line 5—5 of Figure 1.

Figure 6 is a horizontal cross sectional view taken on the line 6—6 of Figure 1.

Figure 7 is an enlarged horizontal cross sectional detail view taken on the line 7—7 of Figure 1.

Figure 8 is a perspective view of the abutment element employed with the inner jaw member of the soldering clamp device shown in Figures 1 to 7.

Referring to the drawings, the soldering clamp device is designated generally at 11 and comprises a first jaw member 12 shaped to receive the bottom wall 13 and the front wall 14 of an eaves trough. Designated at 15 is a depending stud element which is generally U-shaped and which is rigidly secured to the bottom arm 18 of the first jaw member 12. As shown in Figure 7, the stud element 15 has respective vertical arms 16 and 17. Said stud element is provided with the horizontal bight portion 19 connecting the lower ends of the arms 16 and 17. As seen from Figures 1 and 4, the bottom arm or first jaw portion 18 of the first jaw member 12 is related angularly to, and is rigid at one end with, a second jaw portion that extends upwardly from said first jaw portion for engagement against the outer surface of the front wall of the eaves trough.

Designated at 20 is a C-shaped arm having the vertical sleeve portion 21 through which the respective stud arms 16 and 17 are slidably received, as shown in Figure 7. Arm 20 lies in a vertical plane (Figure 2), with vertically spaced upper and lower end portions projecting laterally from the bight thereof, the sleeve portion 21 being formed upon the lower end portion of said arm 20. As is shown in Figures 1 and 4, the vertical sleeve portion 21 is integrally formed on the horizontal lower end portion 22 of the C-shaped arm 20. Rigidly secured to the lower portion 22 of the arm 20 and depending vertically therefrom inside the sleeve element 21 is the threaded shank 23, said shank extending slidably through an aperture provided in the bight portion 19 of the stud element 15. Threadedly engaged on the shank 23 is the clamping nut 24. As will be apparent from Figures 1 and 4, when the nut 24 is tightened against the bight portion 19 of the stud 15, the lower arm 18 of the clamp jaw 12 is forced upwardly relative to the lower portion 22 of the C-shaped arm 20.

As is clearly shown in Figures 1 and 4, the C-shaped arm 20 extends over the top end of the first jaw member 12. Designated at 25 is a second jaw member which is pivotally connected at 26 to the top end of the arm 20 for swinging movement about a horizontal axis. The second jaw member 25 is shaped to fit the inside surfaces of the bottom wall 13 and the front wall 14 of the eaves trough, as is shown in Figures 1 and 4, whereby the surfaces of the bottom and front walls of the troughs may be closely embraced by the respective jaw members 12 and 25. The second jaw member 25 is formed with the large aperture 27 and with the integral horizontal sleeve member 28 which slidably receives a U-shaped stud element 29, said stud element being similar in construction to the stud element 15 above described. The stud element 29 is rigidly secured to a flat abutment plate 30 lying in a vertical plane and engageable with the inside surface of the rear wall 31 of the eaves trough, as is clearly shown in Figure 1. Rigidly secured to the second jaw member 25 and extending slidably through an aperture in the bight portion 32 of the U-shaped stud member 29 is the threaded shank 33 on which is threadedly engaged the clamping nut 34, said clamping nut being engageable with the bight portion 32 of the stud member 29 to force the plate element 30 against the inside surface of the wall 31 of the eaves trough responsive to tightening of the nut 34.

Designated at 35 is a clamp arm hingedly connected to the rear end of the horizontal lower portion 18 of the first jaw member 12 for swinging movement about a horizontal axis, as by the removable hinge pin 36 shown in Figures 1 and 6. The clamp arm 35 is arranged to engage the exterior surface of the rear wall 31 of the eaves trough, in closely spaced parallel relation to the abutment plate 30, as is shown in Figure 1, and has pivotally connected to its top end at 37 the hook member 38, the hook member 28 swinging about a horizontal axis. As shown in Figure 1, the hook member 38 is threadedly connected at 39 to the pivoted yoke member 40, said yoke member being pivotally connected to the top end of the clamp arm 35 at 37. Thus, the hook member 38 may be adjusted relative to the pivotal connection 37.

The hook member 38 is provided with the hook element 41 which is lockingly engageable with a transversely extending pin 42 provided on the second jaw member 25 for fastening the elements in the positions thereof shown in Figure 1. Means is provided for at times locking the second jaw member 25 against rotation relative to the C-shaped arm 20, said means comprising the link bar 44 which is pivotally connected at 45 to the upper end portion of the second jaw member 25 and which is at times secured to the upper portion of the C-shaped arm 20 by a bolt 46 and wing nut 47, the bolt 46 extending through the arm 20 and through the end of the link 44 and being secured by the wing nut 47, as is clearly shown in Figure 5.

In using the device, the clamp device is disposed on the marginal portion of a first eaves trough 50, the second jaw member 25 being first placed inside the trough at the marginal portion thereof and the first jaw member 12 being then swung downwardly to engage the bottom and front walls of the trough. It will be understood that the first jaw member 12 is carried on the arm 20. When the first jaw member 12 has been disposed against the bottom and front walls of the eaves trough, the arm 20 may be locked against rotation relative to the second jaw member by means of the link arm 44, as above described, the bolt 46 being passed through the apertured end of the link arm and the nut 47 being engaged on the bolt and tightened. With the parts thus arranged, the rear clamp arm 35 is swung upwardly to the position thereof shown in Figure 1, and the hook member 38 is engaged with the pin 42. The clamping nuts 24 and 34 are then tightened so that the clamp device is rigidly secured on the eaves trough to define an abutment against which the offset flange element 53 at the end of the trough to be joined thereto may be supported while the soldered connection is made. Thus, as shown in Figure 3, the clamp is engaged on the eaves trough 50 a short distance from the end of the trough, said distance being substantially equal to the length of the soldering flange 53 of the other eaves trough section 51.

After the connection has been made, the clamp device 11 may be removed by loosening the nuts 34 and 24 and by unfastening the link bar 44, permitting the arm 20 to be swung away from the second jaw member 25. The hook arm 38 is disengaged from the pin 42, and if so desired, the hinge pin 36 may be removed to allow the clamp arm 35 to be extracted separately from the remainder of the clamp device.

While a specific embodiment of an improved soldering clamp for use in connecting eaves troughs has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A clamp for an eaves trough having bottom, front, and rear walls, comprising: a generally C-shaped arm having vertically spaced end portions; a first jaw member mounted upon the lower end portion for up and down adjustment relative to the arm, said member including a generally horizontal first jaw portion and a second jaw portion extending upwardly from one end of the first jaw portion to engage against the outer surfaces of said bottom and front walls respectively; a second jaw member pivotally connected to the upper end portion of the arm, the second jaw member including angularly related first and second jaw faces closely spaced from and paralleling the first and second jaw portions respectively in one position to which the second jaw member is swung upon said arm, for engaging the inner surfaces of said bottom and front walls of the eaves trough; means extending between the arm and the second jaw member releasably locking the second jaw member in said position thereof against movement relative to the arm; and an abutment plate lying in a substantially vertical plane and mounted upon the second jaw member for adjustment toward and away therefrom in a generally horizontal direction in said position of the second jaw member, for engaging the inner surface of the rear wall of the trough; a clamp arm hinged at one end to the other end of the first wall portion for swinging movement to a position closely spaced from and paralleling the abutment plate, thus to engage against the outer surface of said rear wall of the trough; and a hook member swingably connected to the other end of the clamp arm, said hook member being releasably connectable to the second jaw member in one position to which the hook member is swung while the clamp arm is in its abutment-plate-paralleling position, to hold the clamp arm in engagement with said rear wall.

2. A clamp for an eaves trough having bottom, front, and rear walls, comprising: a generally C-shaped arm including a bight extending in a substantially vertical plane and upper and lower end portions projecting laterally from the opposite ends of the bight; a first jaw member mounted upon the lower end portion for vertical adjustment relative to the arm, said member including a generally horizontal first jaw portion and a second jaw portion rigid with and extending upwardly from one end of the first jaw portion, to engage against the outer surfaces of said bottom and front walls respectively; a second jaw member connected to the upper end portion of the arm for swinging movement about a horizontal axis, the second jaw member including angularly related, rigidly connected first and second jaw faces closely spaced from and paralleling the first and second jaw portions respectively in one position to which the second jaw member is swung, for engaging the inner surfaces of said bottom and front walls of the eaves trough; means extending between the arm and second jaw member releasably locking the second jaw member in said position thereof against movement relative to the arm; an abutment plate lying in a substantially vertical plane and mounted upon the second jaw member for adjustment toward and away therefrom in a generally horizontal direction in said position of the second jaw member, for engaging the inner surface of the rear wall of the trough; a clamp arm hinged at one end to the other end of the first jaw portion for swinging movement about a horizontal axis to a position closely spaced from and paralleling the abutment plate so as to engage against the outer surface of said rear wall of the trough; and a hook member connected to the other end of the clamp arm for swinging movement about a horizontal axis, said hook member being releasably connectible to the second jaw member in one position to which the hook member is swung while the clamp arm is in its abutment-plate-paralleling position, to hold the clamp arm in engagement with said rear wall.

3. A clamp for an eaves trough having bottom, front, and rear walls, comprising: a C-shaped arm lying in a vertical plane and including a bight and upper and lower end portions projecting laterally from the opposite ends of the bight; a first jaw member disposed above the lower end portion and including a generally horizontal first jaw portion and a second jaw portion rigid with and extending upwardly from one end of the first jaw portion in angular relation thereto, for engagement of the respective jaw portions against the outer surfaces of said bottom and front walls; a stud depending from the first jaw portion and mounted for vertical sliding movement in said lower end portion so as to adjust the jaw portions in a vertical direction into engagement with said bottom and front walls; a second jaw member connected to the upper end portion of the arm for swinging movement about a horizontal axis, the second jaw member including rigidly connected first and second jaw faces angularly related to each other correspondingly to the relative angulation of the jaw portions, said jaw faces being closely spaced from and paralleling the first and second jaw portions respectively in one position to which the second jaw member is swung so as to engage against the inner surfaces of said bottom and front walls of the trough; means extending between the arm and second jaw member releasably locking the second jaw member in said positions thereof against movement relative to the arm; and an abutment plate lying in a substantially vertical plane and slidably mounted upon the second jaw member above the first jaw face for adjustment outwardly from the second jaw member in a horizontal direction in said position of the second jaw member, for engaging the inner surface of the rear wall of the trough; a clamp arm hinged at one end to the other end of the first jaw portion for swinging movement about a horizontal axis to a position closely spaced from and paralleling the abutment plate so as to engage against the outer surface of said rear wall of the trough; and a hook member connected at one end to the other end of the clamp arm for swinging movement about a horizontal axis, said hook member having a separable connection at its other end to the second jaw member in one position to which the hook member is swung while the clamp arm is in its abutment-plate-paralleling position, to hold the clamp arm in engagement with said rear wall.

4. A clamp for an eaves trough having bottom, front, and rear walls, comprising: a C-shaped arm lying in a vertical plane and including a bight and upper and lower end portions projecting laterally from the opposite ends of the bight; a first jaw member disposed above the lower end portion and including a generally horizontal first jaw portion and a second jaw portion rigid with and extending upwardly from one end of the first jaw portion in angular relation thereto, for engagement of the respective jaw portions against the outer surfaces of said bottom and front walls; a stud depending from the first jaw portion and mounted for vertical sliding movement in said lower end portion so as to adjust the jaw portions in a vertical direction into engagement with said bottom and front walls; a second jaw member connected to the upper end portion of the arm for swinging movement about a horizontal axis, the second jaw member including rigidly connected first and second jaw faces angularly related to each other correspondingly to the relative angulation of the jaw portions, said jaw faces being closely spaced from and paralleling the first and second jaw portions respectively in one position to which the second jaw member is swung so as to engage against the inner surfaces of said bottom and front walls of the trough; a link swingably connected at one end to the second jaw member and having a separable connection at its other end to the upper end portion of said arm, so as to releasably lock the second jaw member in said position thereof against movement relative to the arm; and an abutment plate lying in a substantially vertical plane and slidably mounted upon the second jaw member above the first jaw face for adjustment outwardly from the second jaw member in a horizontal direction in said position of the second jaw member, for engaging the inner surface of the rear wall of the trough; a clamp arm hinged at one end to the other end of the first jaw portion for swinging movement about a horizontal axis to a position closely spaced from and paralleling the abutment plate so as to engage against the outer surface of said rear wall of the trough; and a hook member connected at one end to the other end of the clamp arm for swinging movement about a horizontal axis, said hook member having a separable connection at its other end to the second jaw member in one position to which the hook member is swung while the clamp arm is in its abutment-plate-paralleling position, to hold the clamp arm in engagement with said rear wall.

References Cited in the file of this patent

UNITED STATES PATENTS

| Number | Name | Date |
|---|---|---|
| 322,222 | Waters | July 14, 1885 |
| 812,404 | Butler et al. | Feb. 13, 1906 |
| 973,387 | Ruppert | Oct. 18, 1910 |
| 2,266,507 | Neumann et al. | Dec. 16, 1941 |
| 2,304,493 | Bullock | Dec. 8, 1942 |